United States Patent
Kawai et al.

(10) Patent No.: US 7,209,899 B2
(45) Date of Patent: Apr. 24, 2007

(54) MANAGEMENT DEVICE, NETWORK APPARATUS, AND MANAGEMENT METHOD

(75) Inventors: Osamu Kawai, Kawasaki (JP); Hiroshi Oki, Kawasaki (JP); Akio Munakata, Kawasaki (JP); Shoichi Sano, Kawasaki (JP); Toshihisa Nakamura, Kawasaki (JP); Takeshi Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 09/811,549

(22) Filed: Mar. 20, 2001

(65) Prior Publication Data

US 2002/0052848 A1    May 2, 2002

(30) Foreign Application Priority Data

Oct. 31, 2000    (JP)    ............... 2000-333645

(51) Int. Cl.
*G06Q 99/00* (2006.01)
(52) U.S. Cl. .................................. 705/52; 709/226
(58) Field of Classification Search ............ 705/52–53; 379/111–114, 219–221, 226–234, 242–243, 379/265–266; 709/226, 234–235, 238–244
See application file for complete search history.

(56) References Cited

U.S. PATENT DOCUMENTS

| | | | | |
|---|---|---|---|---|
| 5,381,467 A | * | 1/1995 | Rosinski et al. ........ | 379/121.01 |
| 5,404,505 A | * | 4/1995 | Levinson .................... | 707/10 |
| 5,537,468 A | * | 7/1996 | Hartmann .................. | 379/221 |
| 5,615,254 A | * | 3/1997 | Qiu et al. ................... | 379/221 |
| 5,737,414 A | | 4/1998 | Walker et al. .............. | 380/4 |
| 5,781,856 A | * | 7/1998 | Jacobs et al. .............. | 455/403 |
| 5,949,875 A | | 9/1999 | Walker et al. .............. | 380/4 |
| 5,970,050 A | * | 10/1999 | Johnson .................... | 370/238 |
| 5,991,395 A | * | 11/1999 | Miloslavsky ........... | 379/265.02 |
| 6,005,926 A | * | 12/1999 | Mashinsky .................. | 379/114 |
| 6,064,653 A | * | 5/2000 | Farris ......................... | 370/237 |
| 6,104,704 A | | 8/2000 | Buhler et al. .............. | 370/252 |
| 6,223,055 B1 | * | 4/2001 | Cyr ............................ | 455/555 |
| 6,333,979 B1 | * | 12/2001 | Bondi et al. ............... | 379/219 |

(Continued)

FOREIGN PATENT DOCUMENTS

EP    0 866596 A2    9/1998

(Continued)

OTHER PUBLICATIONS

Wieman, "Downsizing Infrastructure", May/Jun. 1996, Technology Review v99n4, pp. 48-55.*

*Primary Examiner*—Mary D. Cheung
(74) *Attorney, Agent, or Firm*—Staas & Halsey LLP

(57) ABSTRACT

A terminal management device manages the sharing by at the least one business entity of costs related to distributed terminal devices. In a case that a new business entity, which uses the terminal devices and provides services after the terminal devices have been distributed, the terminal management device computes and totals the differences of shared costs of each business entity, which will change in accordance with the addition thereof. Thus, by managing the changes of a plurality of business entities bearing the costs related to terminal devices, changes in the shares of the costs thereof can be adjusted easily even in a case that business entities using the terminal devices thereof and providing services change after the terminal devices have been distributed to subscribers. Therefore, the present invention facilitates the participation of a new service business entity in the provision of services using terminal devices subsequent to the terminal devices being distributed.

3 Claims, 10 Drawing Sheets

U.S. PATENT DOCUMENTS

| | | | |
|---|---|---|---|
| 6,545,781 B1 * | 4/2003 | Chang et al. | 359/124 |
| 6,577,422 B1 * | 6/2003 | Frigo et al. | 398/49 |
| 6,611,805 B1 * | 8/2003 | Scharfman et al. | 705/1 |
| 6,950,871 B1 * | 9/2005 | Honma et al. | 709/226 |
| 2002/0004390 A1 * | 1/2002 | Cutaia et al. | 455/424 |

FOREIGN PATENT DOCUMENTS

| | | | |
|---|---|---|---|
| JP | 10-303891 | | 11/1998 |
| JP | 11-068747 | | 3/1999 |
| JP | 11225159 A | * | 8/1999 |
| WO | WO 96/37848 | | 11/1996 |

* cited by examiner

FIG. 4A MachineTable

| MID | serial | hardtype | subscriberID | ~ |
|---|---|---|---|---|
| 3258288732 | S000001 | F90000IA | 1237567 | |
| 3666777888 | S000010 | F90000IA | 9234567 | |
| ~ | ~ | ~ | ~ | |

FIG. 4B Subscriber Table

| subscriberID | affinityID | chargetype | ~ |
|---|---|---|---|
| 1234567 | af0 | normal | ~ |
| 7234567 | af10 | normal | |
| 9234567 | af3 | normal | |
| ~ | ~ | ~ | |

FIG. 4C AffinityTable

| affinity ID | vam1 | vam1-rate | vam2 | vam2-rate | vam3 | vam3-rate | vam4 | vam4-rate |
|---|---|---|---|---|---|---|---|---|
| af0 | ISP1 | 1.00 | null | null | null | null | null | null |
| af1 | ISP1 | 0.67 | ASP1 | 0.33 | null | null | null | null |
| af10 | ISP2 | 1.00 | 1 | null | null | null | null | null |
| af2 | ISP1 | 0.50 | ASP1 | 0.25 | ASP2 | 0.25 | null | null |
| af3 | ISP1 | 0.43 | ASP1 | 0.21 | ASP2 | 0.21 | ASP3 | 0.15 |

FIG. 4D VAMTable

| VAM-ID | name | ~ |
|---|---|---|
| ASP1 | ○△□Securities | |
| ASP2 | ○○Store | ~ |
| ASP3 | ○×Bank | |
| ISP1 | Internet Provider1 | |
| ISP2 | Internet Provider2 | |
| ~ | ~ | |

FIG. 5

Affinity ChangeTable

| affinity change | vam1 | vam1 backrate | vam2 | vam2 backrate | vam3 | vam3 backrate | vam4 | vam4 backrate |
|---|---|---|---|---|---|---|---|---|
| af0toaf1 | ISP1 | 0.33 | ASP1 | -0.33 | null | null | null | null |
| af1toaf2 | ISP1 | 0.17 | ASP1 | 0.08 | A002 | -0.25 | null | null |
| af2toaf3 | ISP2 | 0.07 | ASP1 | 0.04 | A002 | 0.04 | A003 | -0.15 |

FIG. 6

| Affinity change | Unit number | ISP1 calculation | ASP1 calculation | ASP2 calculation | ASP3 calculation |
|---|---|---|---|---|---|
| af0 | 2,500 | 0 | 0 | 0 | 0 |
| af0toaf1 | 7,500 | 7,500 ×¥30000 × (1.00-0.67) | -7,500 ×¥30000 ×0.33 | 0 | 0 |
| af1toaf2 | 5,000 | 5,000 ×¥30000 × (0.67-0.50) | 5,000 ×¥30000 × (0.33-0.25) | -5,000 ×¥30000 ×0.25 | 0 |
| af2toaf3 | 2,500 | 2,500 ×¥30000 × (0.50-0.43) | 2,500 ×¥30000 × (0.25-0.21) | 2,500 ×¥30000 × (0.25-0.21) | -2,500 ×¥30000 ×0.15 |

| subscriberid | affinitychange | date | ~ |
|---|---|---|---|
| 1234567 | af0toaf1 | 00/01/01 | ~ |
| 1234567 | af1toaf2 | 00/04/07 | |
| 1234567 | af2toaf3 | 00/12/25 | |
| 9234567 | af2toaf3 | 00/12/25 | |
| ~ | ~ | ~ | |

FIG. 10

Document
===================================
vam1_charge

26-Dec-00
=================================== name:ISP1
date:00/01/01
Number of change:1
Amount of money:¥10,000 name:ISP1
date:00/04/07
Number of change:1
Amount of money:¥5,000 name:ISP1
date:00/12/25
Number of change:2
Amount of money:¥4,200

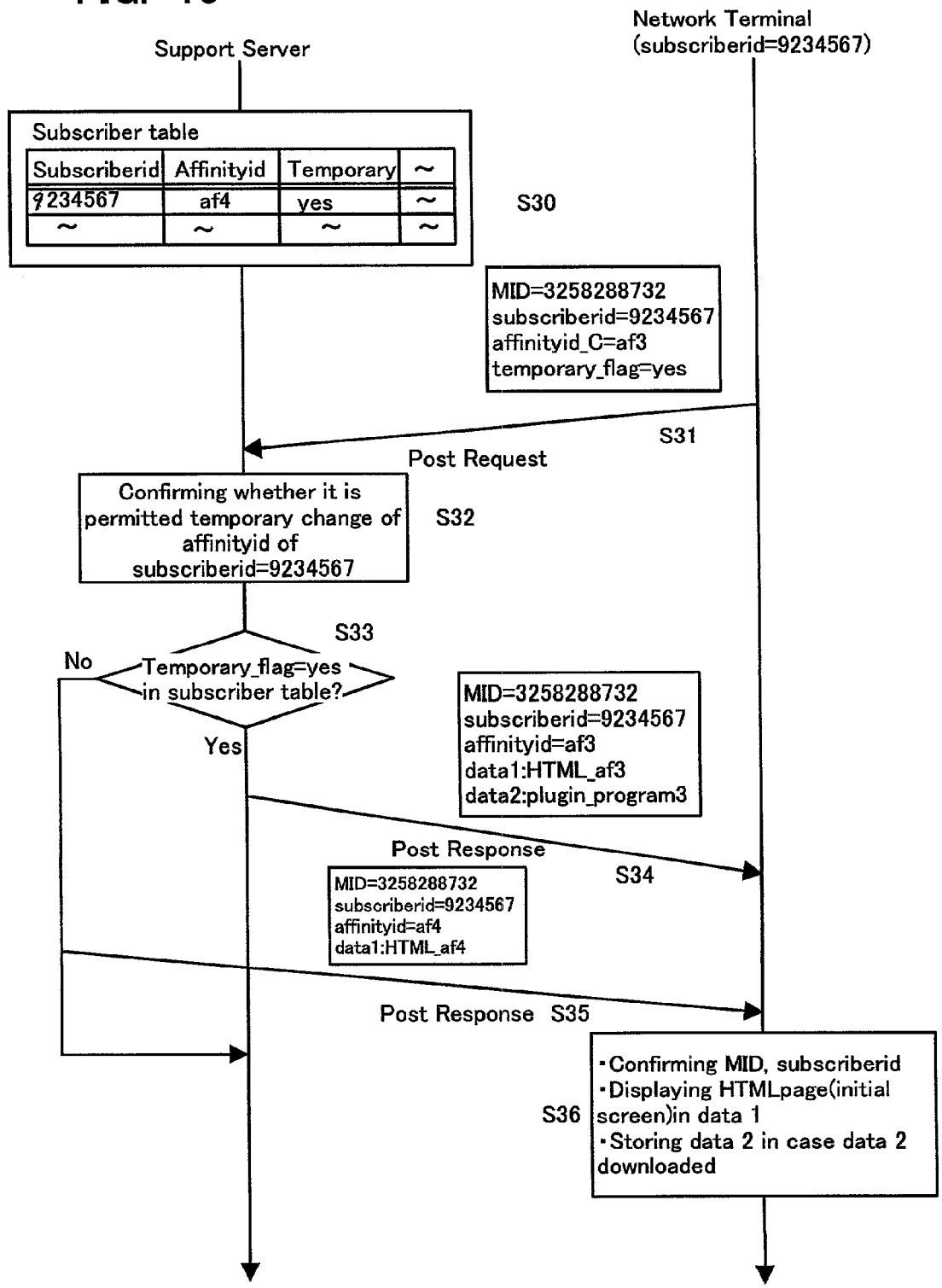

MANAGEMENT DEVICE, NETWORK APPARATUS, AND MANAGEMENT METHOD

BACKGROUND OF THE INVENTION

1. Field of the Invention

The present invention relates to a method for a plurality of business entities to bear the cost of a terminal device, which can make use of services provided by these business entities. More particularly, the present invention relates to a terminal management method and a terminal management device in a case that a plurality of service business entities distribute to subscribers, either gratuitously or for a small fee, terminal devices (network terminals), which connect to a network such as the Internet, and the cost of these network terminals is borne by the plurality of service business entities.

2. Description of the Related Art

In line with the widespread use of the Internet in recent years, service business entities, such as Internet service providers (ISP), which provide Internet connection services, and application service providers (ASP), which provide a variety of services (online shopping, online stock trading, and so forth) over the Internet, are conducting operations, which allow users to subscribe to these services by providing to subscribers, either free-of-charge or for a small fee, terminal devices (network terminals, such as, for example, personal computers or set top boxes), which connect to the Internet, in order to increase the number of users subscribing to these services. In this case, the service business entities recoup the cost of the network terminals provided to subscribers either gratuitously or for a small fee, via the service utilization charges paid by subscribers.

In this manner, service business entities, by increasing the number of subscribers by providing users with either free or inexpensive network terminals, are attempting to increase revenues resulting from the service utilization charges from these subscribers, and are making it possible to continue service provision operations by recouping the cost of network terminals.

However, for example, in a case that personal computers are distributed as network terminals, there have been a rash of incidents in which only the word processing software and such, which either has been installed in these personal computers beforehand, or is installed by a subscriber afterwards, is being used, and the services provided by the service businesses are not being used.

Thus, because services are not being used in accordance with the distributed terminals, revenues from service utilization fees from subscribers are decreasing, and there are also limited funds available for investments designed to acquire subscribers, making it impossible to recoup the cost of the network terminals, and thus impossible to continue service provision operations.

Therefore, there are cases in which shouldering the cost of these network terminals is too great a burden financially for a single service business. In a case such as this, the cost burden on a single service business can be reduced by a plurality of service business entities sharing the cost of distributed network terminals. Network terminals distributed jointly by a plurality of service business entities can make use of the plurality of services provided by these service business entities, and a subscriber will subscribe to each of the services provided by the plurality of service business entities, respectively.

However, it is supposed that there will be cases in which services capable of being used via network terminals will change after network terminals have been distributed to subscribers. For example, there will be cases in which, in addition to services (for example, an Internet connection service and an online stock trading service) by service business entities sharing the cost of initial network terminals, a new service (an online shopping service) by another service business entity, will be added. In a case such as this, this other service business entity is not sharing the cost of the network terminals at network terminal distribution.

Thus, when it becomes possible to utilize a new service provided by another service business entity subsequent to network terminal distribution, there are times when the new service thereof is utilized often, and the services provided by the service business entities sharing the cost of the network terminals are not used.

As a result, whereas revenues of service utilization fees from subscribers increase for this other service business entity, revenues resulting from the service utilization fees of the service business entities sharing the cost of network terminals decrease, making it impossible to continue service provision operations.

SUMMARY OF THE INVENTION

Accordingly, an object of the present invention is to provide a method for managing the sharing of terminal costs that makes the continuation of service operations possible.

Further, an object of the present invention is to provide a terminal management device when a plurality of service business entities are sharing the cost of network terminals, and a terminal device and terminal management method corresponding thereto.

According to the present invention, a terminal management device manages the sharing by at the least one business entity of costs related to distributed terminal devices. For example, in a case that a new business entity, which uses the terminal devices and provides services after the terminal devices have been distributed, the terminal management device computes and totals the differences of shared costs of each business entity, which will change in accordance with the addition thereof. Thus, by managing the changes of a plurality of business entities bearing the costs related to terminal devices, changes in the shares of the costs thereof can be adjusted easily even in a case that business entities using the terminal devices thereof and providing services change after the terminal devices have been distributed to subscribers. Therefore, the present invention facilitates the participation of a new service business entity in the provision of services using terminal devices subsequent to the terminal devices being distributed.

BRIEF DESCRIPTION OF THE DRAWINGS

FIGS. 4A, 4B, 4C and 4D are diagrams illustrating tables stored in a support server 40;

FIG. 5 is an example of a table for storing changes in proportional shares of network terminal costs;

FIG. 6 is a diagram illustrating an example of computations of the costs borne by each business entity;

FIG. 10 is an example of a document;

FIG. 13 is a flowchart of processing between a network terminal and a support server in a third aspect of the embodiment of the present invention.

DESCRIPTION OF THE PREFERRED EMBODIMENTS

The aspects of the embodiment of the present invention will be explained hereinbelow. However, the technical scope of the present invention is not limited to these aspects of the embodiment. Furthermore, in the present invention, a business entity is not only a company (an organization), which provides a service, but also refers to divisions within the same company, which provide different services, and earn revenues, respectively. Further, in the aspects of the embodiment hereinbelow, a terminal device is explained as a terminal device capable of connecting to the Internet (a network terminal), but the present invention is also applicable to a terminal device other than a network terminal.

Figure 1:
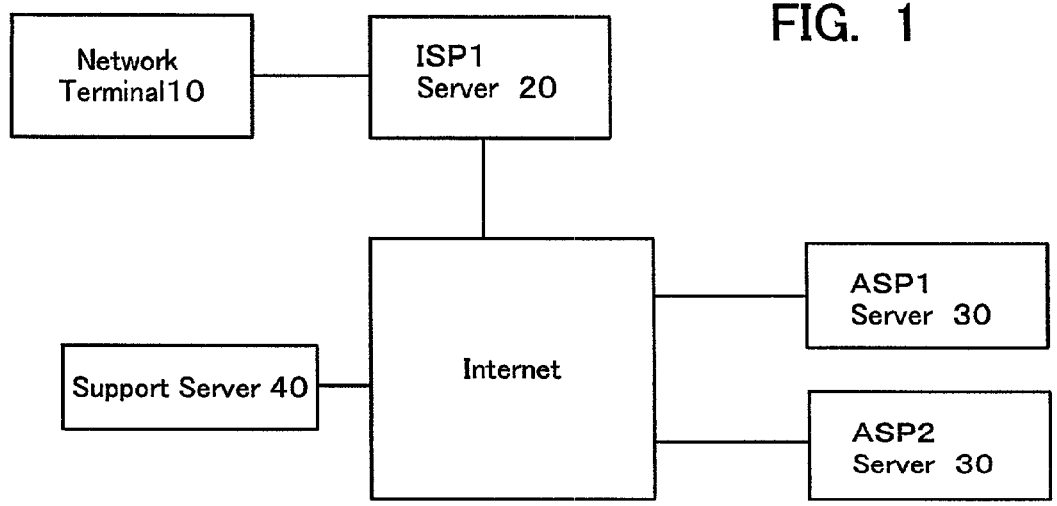
FIG. 1 is an example of a network configuration in an aspect of the embodiment of the present invention.

FIG. 1 is an example of a network configuration in an aspect of the embodiment of the present invention. In FIG. 1, a network terminal 10 is connected to the Internet via a server 20 of an Internet service provider (ISP), which is a service business entity. Subscriber network terminal 10 is, for example, a personal computer capable of connecting to the Internet, or a network connection device (Internet appliance (IA)) capable of connecting only to a server of a specific service business entity, and is given out, either free-of-charge or for a small fee, to a subscriber from at the least one service business entity. That is, a service business entity bears at the least a portion of the cost of a network terminal given out to a subscriber.

Further, a server 30 of an application service provider (ASP), which is a service business entity providing services over the Internet, is connected to the Internet. Furthermore, a support server 40, which performs network terminal management tasks characteristic of the present invention, is connected to the Internet. The support server 40, as will be explained in detail hereinbelow, in a case that a plurality of service business entities share the cost of a network terminal, manages the proportional shares thereof, and manages the types of services that a network terminal receives.

Figure 2:
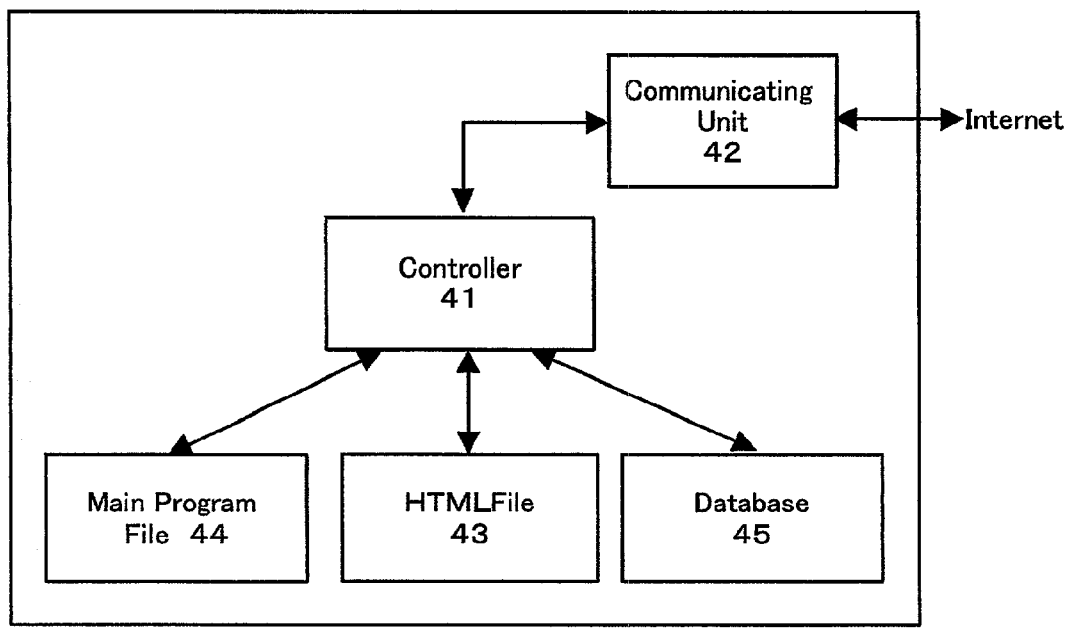
FIG. 2 is an example of a configuration of a support server 40.

FIG. 2 is an example of a configuration of a support server 40. The support server 40 is, for example, a Web server connected to the Internet. In FIG. 2, the controller 41 of the support server 40 is constituted from a CPU, memory, and so forth, performs file read-out control, file transfer control, database search/update control, and various arithmetic processing, and performs the management tasks of the present invention. The communicating unit 42 receives data from a network terminal 10 and sends same to the controller 41, and transmits a file sent from the controller 41 to a network terminal 10. Further, the following files are stored in a predetermined storing unit of the support server 40.

An HTML file 43 is a file of pages described in the HTML language. A main program file 44 comprises a program for reading out an HTML (HyperText Markup Language) file and sending same to a communications device, a program for processing data from a network terminal, a program for searching/updating a database, an operational program for using a database and creating the documents/vouchers of each service business entity, and a CGI (common gateway interface) program. Further, a database 45 stores various tables, which will be explained hereinbelow.

Figure 3:
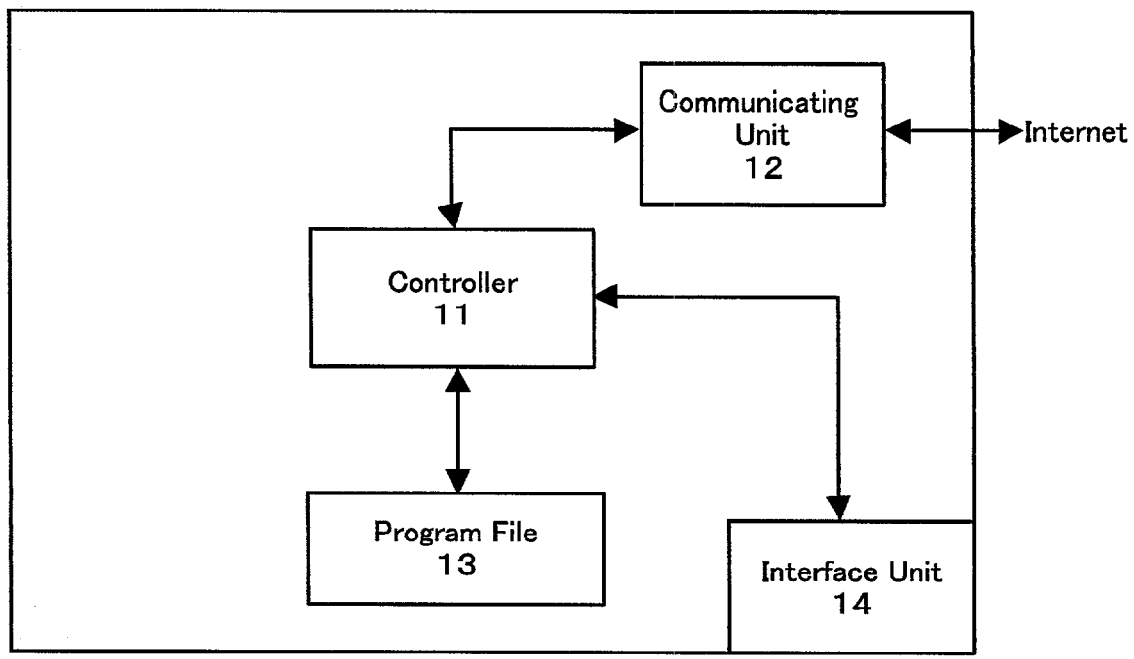
FIG. 3 is an example of a configuration of a network terminal.

FIG. 3 is an example of a configuration of a network terminal. A network terminal 10 is, for example, a personal computer or a set top box. In FIG. 3, the controller 11 of the network terminal 10 is constituted from a CPU, memory, and so forth, and controls communications with a server on a network, controls the display of a received file, and controls various processing. A communicating unit 12 receives data from a support server 40 or some other server on a network, sends same to the controller 11, and sends data sent from the controller 11 to a server on a network. Further, a program file 13 stored in a predetermined storing unit of a network terminal comprises a browser program for displaying information from a server. Furthermore, the network terminal 10 may also comprise an interface unit (for example, a card slot or the like) 14 for reading a removable storage medium (a memory card, IC card, floppy disk, CD-ROM or the like).

FIGS. 4A, 4B, 4C and 4D are diagrams illustrating examples of tables stored in a support server 40. The support server 40 manages in accordance with the following tables a network terminal ID (MID) for identifying a network terminal, a subscriber ID for identifying a subscriber, a VAM-ID for identifying a service business entity (or what is also called a VAM (value adder marketer)), and an affinity ID for identifying the combination type of at the least one service business entity bearing the costs of network terminals. The affinity ID will be explained below.

The network terminal table (machine table) shown in FIG. 4A stores a subscriber ID corresponding to each network terminal ID (MID), and furthermore, the manufacturing number (serial), type (hardtype) and unit cost (not shown in the figure) of each network terminal. The subscriber table shown in FIG. 4B stores each subscriber ID, affinity ID, chargetype, and a subscriber name, which is not shown in the figure, corresponding to a subscriber ID. The affinity table shown in FIG. 4C stores a VAM-ID corresponding to each affinity ID, and the proportional share of network terminal costs of a service business entity corresponding to each VAM-ID. Further, the VAM table in FIG. 4D stores the name of a service business entity corresponding to each VAM-ID.

Here, the affinity ID will be explained. The affinity ID, as mentioned hereinabove, is an ID for identifying the combination type of at the least one service business entity bearing the cost of network terminals. By assigning each affinity ID to each network terminal (each subscriber), it is possible to identify the type of service that each network terminal (each subscriber) is receiving. For example, as shown in FIG. 4C, affinity ID="af0" is an example in which only service business entity ISP1 bears the cost of network terminals (that is, the proportional share is 1), and as shown in FIG. 4B, the subscriber of subscriber ID "1234567" can receive a service business entity ISP1-provided service by connecting the network terminal of assigned network terminal ID "3258288732" (See FIG. 4A) to the Internet.

Further, affinity ID="af3" is an example in which service business entities ISP1, ASP1, ASP2 and ASP3 share the cost of network terminals, and the proportional shares thereof are, for example, 0.43 for service business entity ISP1, 0.21 for both service business entity ASP1 and service business entity ASP2, and 0.15 for service business entity ASP3. And then, as shown in FIG. 4B, when the subscriber of subscriber ID "9234567" connects the network terminal of assigned network terminal ID "3666777888" (See FIG. 4A) to the Internet, it is possible to receive services provided by service business entities ISP1, ASP1, ASP2, and ASP3.

Furthermore, in the case of the above-mentioned affinity ID="af0", initially only service business entity ISP1 bore the cost of network terminals, and it was only possible to use a service provided by service business entity ISP1, but thereafter, in a case that it was made possible for the network terminal corresponding to affinity ID="af0" to utilize a service provided by service business entity ASP1, as shown in FIG. 4C, a new affinity ID="af1" is set, and proportional shares of network terminal costs of service business entities ISP1 and ASP1 (for example, 0.67 for service business entity ISP1 and 0.33 for service business entity ASP1) are set.

Therefore, for service business entity ISP1, the proportional share of network terminal costs is reduced from the initial 1 to 0.67, and for service business entity ASP1, a new cost of a proportional share of 0.33 is generated. However, the network terminal corresponding to affinity ID="af0" has already been given to a subscriber, and the cost thereof is being born by service business entity ISP1. In this case, the difference of the proportional share portion of service business entity ASP1 can be paid from service business entity ASP1 to service business entity ISP1.

Support server 40 has a table for storing changes in the proportional shares of network terminal costs as shown in FIG. 5. According to FIG. 5, in a case that a network terminal affinity ID changes from "af0" to "af1" (affinity change of "af0 to af1"), the payment of a cost of a proportional share backrate of 1−0.67=0.33 is generated from service business entity ASP1 to service business entity ISP1.

Furthermore, in a case that a service of service business entity ASP2 is added for the network terminal of affinity ID "af1", new affinity ID="af2" is set. At this time, as shown in FIG. 4C, the proportional shares of network terminal costs between the respective service business entities ISP1, ASP1, ASP2 is set at 0.5, 0.25, and 0.25, respectively. By so doing, as shown in the change table of FIG. 5, the change portion of the proportional shares of each service business entity, respectively, becomes Service business entity ISP1: 0.67−0.5=0.17
Service business entity ASP1: 0.33−0.25=0.08
Service business entity ASP2: 0−0.25=0.25 When a proportional share thereof is a positive number, this indicates that there will be income from another service business entity, and when same is a negative number, this indicates that a payment must be made to another service business entity.

FIG. 6 is a diagram illustrating an example of computations of the shared costs of each business entity. In FIG. 6, initially, for example, service business entity ISP1 distributes 10,000 units of a network terminal of a unit cost of 30,000 yen. The affinity ID at this time is set at "af0". And then, it is supposed that service business entity ISP1 has finished paying 10,000×30,000 yen, which was the initial cost thereof. For a certain period of time (for example, a quarter of a year), the difference of shared cost of each service business entity when a change of affinity ID occurs will be illustrated. In the figure, a plus cost indicates an income, and a minus cost indicates a payment.

In FIG. 6, of the initial 10,000 units of network terminals of affinity ID "af0", 7,500 units become capable of using a service of service business entity ASP1, and the affinity ID thereof is changed to "af1". Furthermore, of the 7,500 units of network terminals of affinity ID "af1", 5,000 units become capable of using a service of service business entity ASP2, and the affinity ID thereof is changed to "af2". Furthermore, of the 5,000 units of network terminals of affinity ID "af2", 2,500 units become capable of using a service of service business entity ASP3, and the affinity ID thereof is changed to "af3". And then, for each affinity change, the difference of the shared cost of each service business entity is computed with regard to the number of units of network terminals for which affinity changed. Furthermore, the computations shown in FIG. 6 can also be determined by computations from the affinity table of FIG. 4C without creating a change table like that shown in FIG. 5.

Further, when a new affinity ID is set, the affinity ID in the subscriber table shown in FIG. 4B is also changed to a new affinity ID. For example, when new affinity ID="af1" is generated for affinity ID="af0", subscriber affinity IDS of affinity ID="af0" in the subscriber table are all changed to "af1". Thus, when a new affinity ID is set, affinity IDs constituting the origins thereof in the subscriber table are all changed to the new affinity ID.

Figure 7:
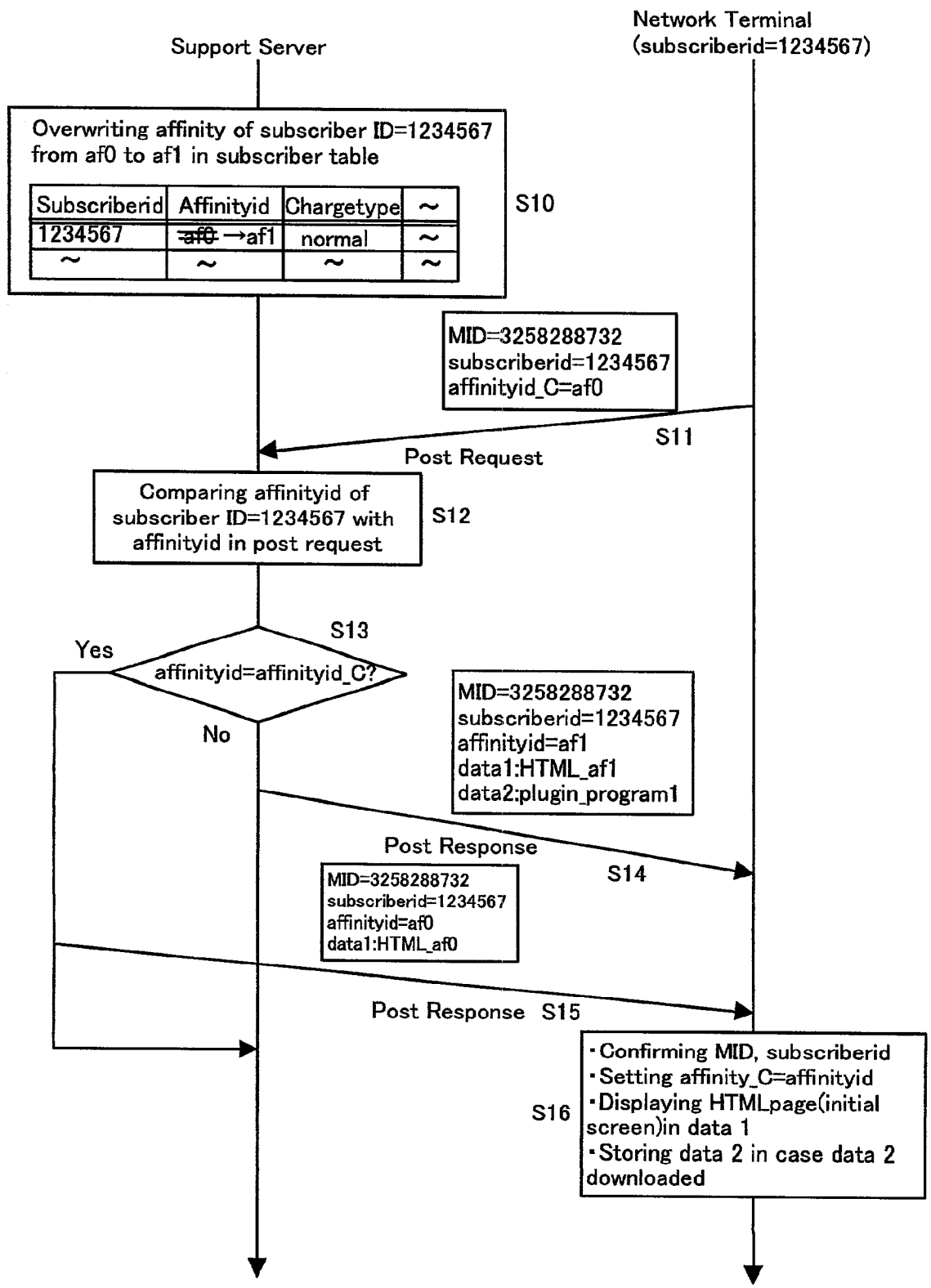
FIG. 7 is a flowchart of processing between a network terminal and support server in a first aspect of the embodiment of the present invention.

FIG. 7 is a flowchart of network terminal—support server processing in a first aspect of the embodiment of the present invention. The network terminal—support server communications protocol is, for example, an HTTP (Hypertext Transfer Protocol), which uses port=80h. In FIG. 7, the support server 40 overwrites the subscriber table (S10) when the affinity ID of subscriber ID "1234567"is changed from "af0" to "af1". Then, it is supposed that the subscriber used the network terminal for the first time subsequent to the subscriber table being overwritten. The network terminal 10 is constituted so as to access the support server 40 at startup, and by specifying the URL (universal resource locator) of the support server 40, an access request (post request) is sent to the support server 40 (S11). An access request comprises the network terminal ID (MID), subscriber ID and affinity ID stored in the network terminal 10.

Upon receiving an access request, the support server 40 references the subscriber table shown in FIG. 4B, acquires an affinity ID corresponding to the received subscriber ID, and furthermore, then compares the affinity ID (affinityid) acquired from the subscriber table with the received affinity ID (affinityid_C) (S12). When there is match in Step S13, the support server 40 sends as an access response (post response) an HTML file (data1) for displaying a service menu screen corresponding to affinity ID "af0", together with the network terminal ID (MID), subscriber ID and affinity ID (here, "af0") (S14).

Conversely, when there is no match in Step S13, the support server 40 selects the affinity ID acquired from the subscriber table (here, "af1"), sends the affinity ID thereof, the network terminal ID and the subscriber ID to the network terminal 10, and furthermore, sends as an access response (post response) an HTML file (data1) for displaying a service menu screen corresponding to affinity ID "af1", and an additional plug-in program (data2) corresponding to affinity ID "af1" (S15).

In a case that an additional program is added, for example, by a bank service business entity in accordance with the change to affinity ID "af1", the additional program is a program for managing a bank account. Further, service menu screen data was sent from the support server to a network terminal here, but service menu screens corresponding to each affinity ID can also be stored in a network terminal.

Upon receipt thereof, the network terminal 10 performs the following response processing (S16). That is, the network terminal 10 confirms that each network terminal ID and subscriber ID received is the ID stored internally, and furthermore, overwrites the stored affinity ID with the received affinity ID. In accordance therewith, an affinity ID stored in the network terminal can be updated. Furthermore, a service menu screen (initial screen) corresponding to an HTML file is displayed on the network terminal 10. Further, in a case that a plug-in program or other additional program has been downloaded, this program is stored in a predetermined storing unit. In accordance therewith, the network terminal operates as affinity ID "af1" thereafter.

Figures 8, 9:
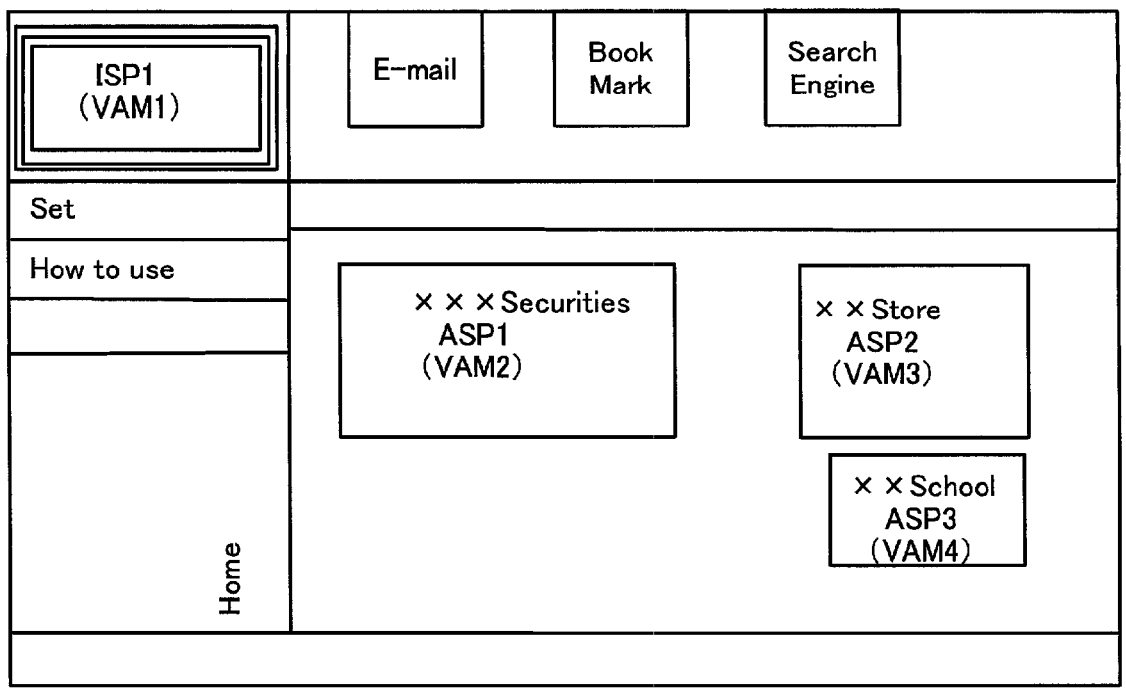
FIG. 8 is an example of an initial screen displayed on a network terminal.
FIG. 9 is an example of a table of a history of affinity ID updates.

FIG. 8 is an example of an initial screen being displayed on a network terminal. As shown in FIG. 8, buttons for selecting a service business entity, which is specified by an affinity ID, are displayed on the service menu screen. FIG. 8 is a screen corresponding to affinity ID "af3" in FIG. 4C. Then, by a subscriber selecting the displayed button of a desired service business entity, the URL of a server of the selected service business entity is specified, and the network terminal 10 connects to this server. The server of the service business entity sends a file for displaying a predetermined service provision screen in accordance with a request from the network terminal 10, and the screen corresponding to this file is displayed on the network terminal 10.

Further, as shown in FIG. 8, the size of the button can be constituted such that the button size differs in accordance with a service business entity's proportional share of costs.

Thus, when a new affinity ID is set, by a network terminal 10 of a subscriber corresponding to this affinity ID connecting to the support server 40, the affinity ID of the network terminal 10 is also updated, and it becomes possible for the subscriber 10 to receive a new service.

The support server 40 manages the affinity ID change history of the network terminal 10.

FIG. 9 is an example of an affinity ID change history table. In FIG. 9, when the affinity ID of a network terminal 10 is updated based on the connection from the network terminal 10, the table stores the subscriber ID, the pre- and post-update affinity IDs, and the update date corresponding to the network terminal 10 thereof. And then, the support server 40 can regularly (for example, every month or every year) create a document like that shown in FIG. 10 based on the change history table of FIG. 9. The document is a statement of fluctuations in the shared amounts of network terminal costs of each service business entity during a predetermined period. In FIG. 10, there is an example of a document of service business entity VAM1 for a certain year, and the differences in line with changes of proportional shares is computed based on the table of FIG. 5. Furthermore, in FIG. 10, amounts are computed using a network terminal unit cost of 30,000 yen. Further, the amount of money received is recorded in the document of service business entity ISP1, but the amount of money paid out is recorded in the document of a service business entity paying the charge.

Further, as explained above, after an affinity ID is changed, adjustments to the proportional shares (or charges) of the service business entities are made in relation to network terminals connected to the support server 40, but the support server 40 can also adjust the proportional shares (charges) of the service business entities all at once for all network terminals for which the affinity ID has changed.

Thus, a support server 40 in an aspect of the embodiment of the present invention performs management tasks, such as customizing a network terminal 10 and adjusting the proportional shares of network terminal costs when a change occurs in the services provided to a network terminal 10. Consequently, after a certain service business entity has distributed to subscribers network terminals dedicated to the service of the service business entity thereof, even in a case that a new service business entity wishes to commence a service using the network terminals thereof, by the support server 40 undertaking in accordance with the above-mentioned management tasks the troublesome procedures accompanying the participation of a new service business entity, adding a service business entity, which will utilize the network terminals, becomes easy. Further, due to the participation of a new service business entity, the proportional share of network terminal costs of each service business entity is also reduced.

Figure 11:
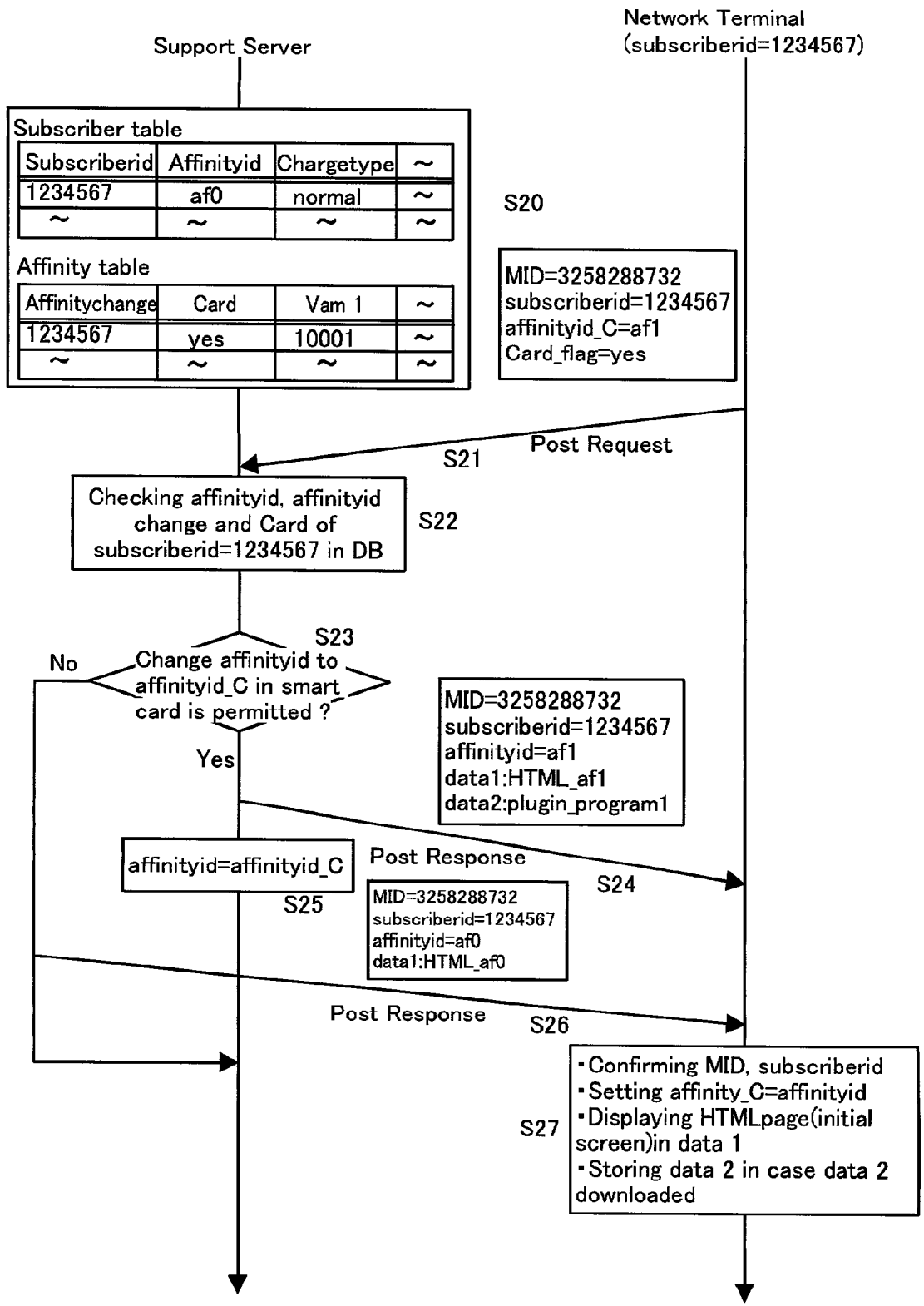
FIG. 11 is a flowchart of processing between a network terminal and a support server in a second aspect of the embodiment of the present invention.

FIG. 11 is a flowchart of processing between a network terminal and support server in a second aspect of the embodiment of the present invention. In the second aspect of the embodiment, an affinity ID stored in a network terminal 10 is changed using a storage medium capable of being removed from a network terminal 10. The storage medium is, for example, an IC card, memory card or the like. More specifically, in a case that a service provided to a network terminal has been added, the support server 40 issues a new affinity ID the same as explained hereinabove. In the following example, a case that the affinity ID is changed from "af0" to "af1" will be explained. And then, either the operator of the support server 40, or the service business entity constituting the affinity ID thereof gives out to a subscriber the storage medium on which the affinity ID thereof is stored. The storage medium is, for example, sent by mail.

In FIG. 11, the states of a subscriber table and an affinity table in the support server 40 are shown in Step S20. In Step S20, the affinity ID corresponding to subscriber ID "1234567" is still "af0". Further, a flag ("Card") as to whether or not a change of affinity ID in the storage medium (here, a smart card) will be permitted, has been added to the affinity table.

A subscriber receiving the storage medium on which a new affinity ID is stored, in a state that the storage medium has been placed in his own network terminal, may connect the network terminal 10 to the support server 40.

By so doing, the network terminal 10 sends to the support server 40 an access request (post request) comprising a network terminal ID, subscriber ID, affinity ID and a card flag (Card_flag=yes) indicating the use of the storage medium (S21). Here, the affinity ID comprising the access request is not the affinity ID stored inside the network terminal, but rather the affinity ID stored on the storage medium. Furthermore, as for the network terminal ID and subscriber ID, the ones stored inside the network terminal are used. Therefore, the network terminal 10 checks whether or not a storage medium is placed in the interface unit 14 at access request time, and in a case that a storage medium is placed, reads out the information stored on the storage medium thereof, and in a case that an affinity ID is read out, sends same. In a case that a storage medium is not placed, the affinity ID stored inside the network terminal is sent as is customary.

Upon receiving an access request, the support server 40 references the subscriber table shown in FIG. 4B, acquires the affinity ID corresponding to the received subscriber ID, and furthermore, then compares the affinity ID acquired from the table with the received affinity ID (S22). Furthermore, the support server 40 confirms whether or not use of the storage medium is permitted based on the "Card" flag of the affinity table. In the second aspect of the embodiment, the subscriber table of FIG. 4B is not updated when a new affinity ID is issued. Consequently, in a case that an affinity ID stored on a storage medium is received, the affinity IDs do not match. Conversely, in a case that an affinity ID of inside a network terminal is received, the affinity IDs do match. When there is a match in Step S23, the processing of FIG. 9 above is the same. That is, the support server 40 sends an HTML file for displaying a service menu screen corresponding to each ID and affinity ID "af0" (S26). And then, the service menu screen corresponding to "af0" is displayed on a network terminal 10. Further, in a case that use of a storage medium is not permitted in Step S23, response processing corresponding to affinity ID "af0" is performed the same as in the above case that there was a match without changing the affinity ID (S26).

In a case that use of a storage medium is permitted, and moreover, affinity IDs do not match, the support server 40 updates the affinity ID in the subscriber table corresponding to the subscriber thereof with the received new affinity ID (S25). Furthermore, the support server 40 selects the received affinity ID (here, "af1") the same as the first aspect of the embodiment explained hereinabove, sends the affinity ID thereof, the network terminal ID and the subscriber ID to a network terminal 10, and furthermore, sends as an access response (post response) an HTML file (data1) for displaying a service menu screen corresponding to affinity ID "af1", and an additional plug-in program (data2) corresponding to affinity ID "af1" (S24). Then, upon receipt thereof, the network terminal 10 performs response processing the same as Step S16 in the above-mentioned first aspect of the embodiment (S27).

In the above-mentioned second aspect of the embodiment, a case that a distributed storage medium is used was explained as an example of changing an affinity ID in accordance with the desire of a subscriber, but the present invention is not limited thereto, and, for example, a service menu screen corresponding to an original affinity ID can also be used.

Figure 12:
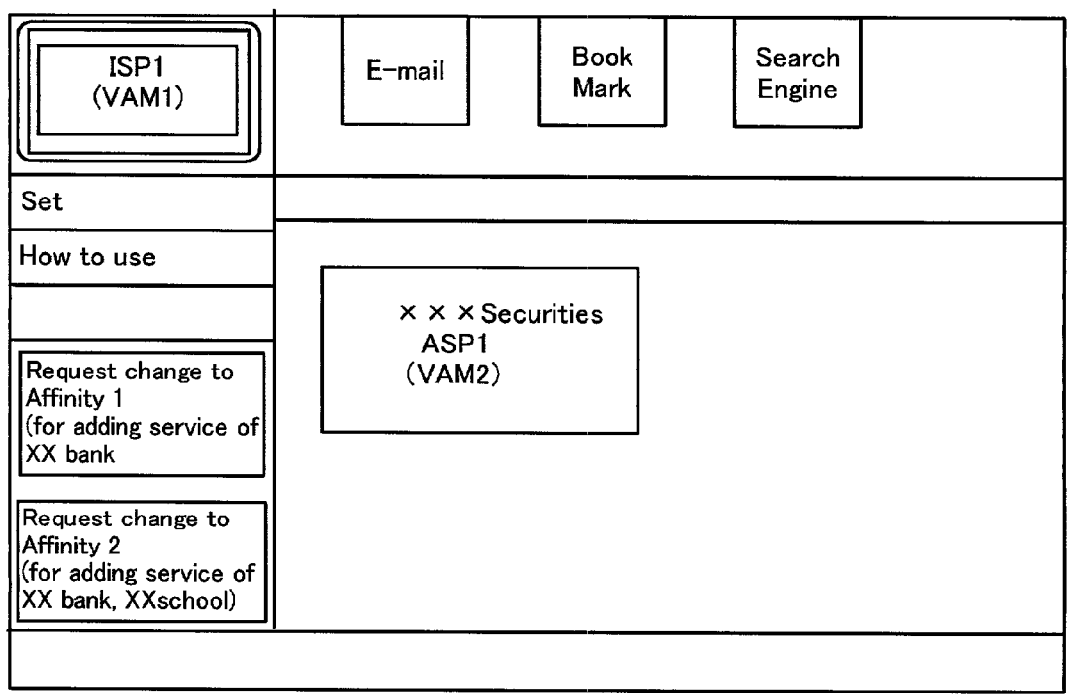
FIG. 12 is an example of a service menu screen displaying an affinity ID change menu.

FIG. 12 is an example of a service menu screen for displaying an affinity ID change menu. FIG. 12 is, for example, a service menu screen of affinity ID "af1", and furthermore, displays buttons for requesting a change to either affinity ID "af2" or affinity ID "af3". By a subscriber clicking on a button thereof, a new access request (post request) comprising a new affinity ID is sent to the support server.

FIG. 13 is a flowchart of processing between a network terminal and the support server in a third aspect of the embodiment of the present invention. A case that the third aspect of the embodiment uses an affinity ID stored on a storage medium and temporarily changes an affinity ID will be explained. In FIG. 13, the state of the subscriber table in the support server 40 is shown in Step S30. In Step S30, the affinity ID corresponding to subscriber ID "1234567" is "af4". Further, in the subscriber table, there has been added flag "temporary" as to whether or not the temporary change of affinity ID in accordance with a storage medium is permitted.

A subscriber (subscriber ID "1234567") receiving a storage medium on which is stored a different affinity ID (here, "af3"), in a state wherein the storage medium has been placed in his own network terminal, is allowed to connect the network terminal 10 to the support server 40.

By so doing, the network terminal 10 sends to the support server 40 an access request (post request) comprising a network terminal ID, subscriber ID, affinity ID "af3" and a temporary change flag (temporary_flag=yes) signifying the temporary use of the affinity ID thereof (S31). Here, the affinity ID comprising the access request is not the affinity ID stored inside the network terminal, but rather is affinity ID "af3" stored on the storage medium.

Upon receiving an access request, the support server 40 references the subscriber table shown in FIG. 4B, acquires the affinity ID corresponding to the received subscriber ID, and furthermore, then compares the received affinity ID with the affinity ID acquired from the table. In this aspect of the embodiment, the two do not match. Then, the support server 40 confirms whether or not a temporary change of affinity ID is permitted based on the temporary change flag (temporary) of the subscriber table (S32). And then, in Step S33, in a case that a temporary change of affinity ID is permitted, the support server 40 performs access response corresponding to the different affinity ID "af3" the same as Step S14 in the above-mentioned first aspect of the embodiment (S34), and in a case that a temporary change of affinity ID is not permitted, the support server 40 performs access response corresponding to the original affinity ID "af4" the same as Step S15 in the first aspect of the embodiment (S35).

Then the network terminal 10 performs response processing for the access responses thereof the same as Step S16 in the above-mentioned first aspect of the embodiment (S36). However, in this aspect of the embodiment, because the change of affinity ID is temporary, unlike Step S16, the affinity ID is not overwritten.

In the above-mentioned aspects of the embodiment, the adjustment of the proportional shares of the purchase costs of network terminals was explained as the costs related to network terminals, but the present invention is not limited thereto. For example, in a case that a predetermined fee is charged monthly as a service provision fee or network terminal support fee to subscribers to whom network terminals were distributed, the proportional share of each service business entity can also be adjusted with regard to the service provision fee and so forth thereof.

The terminal device in the aspects of the embodiment of the present invention is not limited to a terminal device (network terminal) capable of connecting to a network; a terminal device other than a network terminal is also applicable.

According to the above present invention, a terminal management device of the present invention manages the sharing by at the least one business entity of costs related to distributed terminal devices. For example, in a case that a new business entity, which uses the terminal devices and provides services after the terminal devices have been distributed, the terminal management device computes and totals the differences of shared costs of each business entity, which will change in accordance with the addition thereof. Thus, by managing the changes of a plurality of business entities bearing the costs related to terminal devices, changes in the shares of the costs thereof can be adjusted easily even in a case that business entities using the terminal devices thereof and providing services change after the terminal devices have been distributed to subscribers. Therefore, the present invention facilitates the participation of a new service business entity in the provision of services using terminal devices subsequent to the terminal devices being distributed.

The scope of protection of the present invention is not limited to the above-mentioned aspects of the embodiment, but rather extends to the inventions disclosed in the claims and equivalents thereof.

What is claimed is:

1. A management device to manage a share of costs related to network apparatuses, wherein each network apparatus is connected to a network, said management device comprising:
   a storing unit storing management information to classify each network apparatus based on a combination type, wherein said combination type is a type of a combination of business entities providing service to network apparatuses and corresponding shared costs of each of the business entities related to the providing of the network apparatuses, each network apparatus receiving the service from a business entity specified by said combination type;
   a managing unit managing sharing of costs related to each network apparatus based on said combination type; and
   a communicating unit receiving said combination type stored beforehand in a network apparatus with a network connection request from the network apparatus, wherein
   when said combination type is changed relative to each network apparatus, the combination type of each network apparatus stored in said management information is updated to a combination type of the network apparatus subsequent to the change,
   said managing unit compares said received combination type with the network apparatus combination type stored in said management information, and in the case of a match, sends to the network apparatus information corresponding to the combination type, and in a case that there is not a match, sends to the network apparatus information corresponding to the combination type stored in said management information, and furthermore, by sending to the network apparatus the combination type of the network apparatus subsequent to said change, updates the combination type stored in the network apparatus to the combination type of the network apparatus subsequent to said change.

2. A management device to manage a share of costs related to network apparatuses, wherein each network apparatus is connected to a network, said management device comprising:
   a storing unit storing management information to classify each network apparatus based on a combination type, wherein said combination type is a type of a combination of business entities providing service to network apparatuses and corresponding shared costs of each of the business entities related to the providing of the network apparatuses, each network apparatus receiving the service from a business entity specified by said combination type;
   a managing unit managing sharing of costs related to each network apparatus based on said combination type; and
   a communicating unit receiving said combination type sent from a network apparatus with a network connection request from the network apparatus,
   wherein said managing unit compares said received combination type with the network apparatus combination type stored in said management information, and in the case of a match, sends to the network apparatus information corresponding, to the combination type, and in a case that there is not a match, sends to the network apparatus information corresponding to said received combination type, and furthermore, updates the network apparatus combination type stored in said management information to said received combination type.

3. The management device according to claim 2, wherein, in a case that there is no said match, upon receiving predetermined temporary change information together with said combination type sent from the network apparatus, said communicating unit sends to the network apparatus information corresponding to said received combination type, and does not update said management information.

* * * * *